United States Patent [19]
Dragone

[11] Patent Number: 5,488,680
[45] Date of Patent: Jan. 30, 1996

[54] FREQUENCY ROUTING DEVICE HAVING A WIDE AND SUBSTANTIALLY FLAT PASSBAND

[75] Inventor: Corrado Dragone, Little Silver, N.J.

[73] Assignee: AT&T Corp., Murray Hill, N.J.

[21] Appl. No.: 295,445

[22] Filed: Aug. 24, 1994

[51] Int. Cl.⁶ .................................................. G02B 6/28
[52] U.S. Cl. ............................... 385/24; 385/31; 385/37; 385/46
[58] Field of Search ................................. 385/24, 31, 37, 385/39, 45, 46

[56] References Cited

U.S. PATENT DOCUMENTS

| | | | |
|---|---|---|---|
| 5,002,350 | 3/1991 | Dragone | 385/24 |
| 5,136,671 | 8/1992 | Dragone | 385/46 |
| 5,293,436 | 3/1994 | Diemeer | 385/14 X |
| 5,339,157 | 8/1994 | Glance et al. | 385/24 |
| 5,367,586 | 11/1994 | Glance et al. | 385/46 X |
| 5,373,516 | 12/1994 | Glance et al. | 385/17 X |
| 5,412,744 | 5/1995 | Dragone | 385/24 |

OTHER PUBLICATIONS

"Silica Waveguides On Silicon And Their Application To Integrated-Optic Components," *Optical and Quantum Electronics*, 22 M. Kawachi, (1990) pp. 391–416.

*Primary Examiner*—John D. Lee
*Assistant Examiner*—Phan T. H. Palmer
*Attorney, Agent, or Firm*—Stuart H. Mayer

[57] ABSTRACT

An optical apparatus is provided that includes a first frequency routing device having at least one input port and P output ports, where P>2. A second frequency routing device is also provided that has P input ports and at least one output port. P optical paths couple the input port of the first frequency routing device to the output port of the second frequency routing device.

15 Claims, 6 Drawing Sheets

N×N ROUTER

FREQUENCY ROUTING DEVICE HAVING A WIDE AND SUBSTANTIALLY FLAT PASSBAND

FIELD OF THE INVENTION

This invention relates to an optical interconnection apparatus which is capable of optical switching, multiplexing, and demultiplexing functions. More particularly, this invention relates to an optical interconnection apparatus that has a wide and substantially flat passband.

BACKGROUND OF THE INVENTION

Optical switching, multiplexing, and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler, the outputs of which form the outputs of the switching, multiplexing, and demultiplexing apparatus. An example of such an interconnection apparatus is disclosed in U.S. Pat. Nos. 5,002,350 and 5,136,671.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are referred to as frequency routing devices.

Known frequency routing devices do not efficiently provide a flat passband between a distinct one of the input ports and a distinct one of the output ports. U.S. application Ser. No. 238,074 entitled "Frequency Routing Device Having Wide and Substantially Flat Passband" U.S. Pat. No. 5,412,744 discloses a frequency routing device in which a flat passband is achieved by combining a frequency routing device with an optical coupler. One limitation of this device however is that there is an inherent loss of optical power due to the presence of the coupler.

SUMMARY OF THE INVENTION

In accordance with the present invention, an optical apparatus is provided that includes a first frequency routing device having at least one input port and P output ports, where P>2. A second frequency routing device is also provided that has P input ports and at least one output port. P optical paths couple the input port of the first frequency routing device to the output port of the second frequency routing device.

In one embodiment of the invention the optical paths each have a transmission coefficient substantially equal to unity at a distinct optical wavelength. Moreover, each of the transmission coefficients is substantially equal to one half unity at an intermediate wavelength approximately halfway been adjacent ones of the distinct optical wavelengths. The transmission coefficients of the optical paths may all have substantially the same group delay.

DETAILED DESCRIPTION

Figure 1:
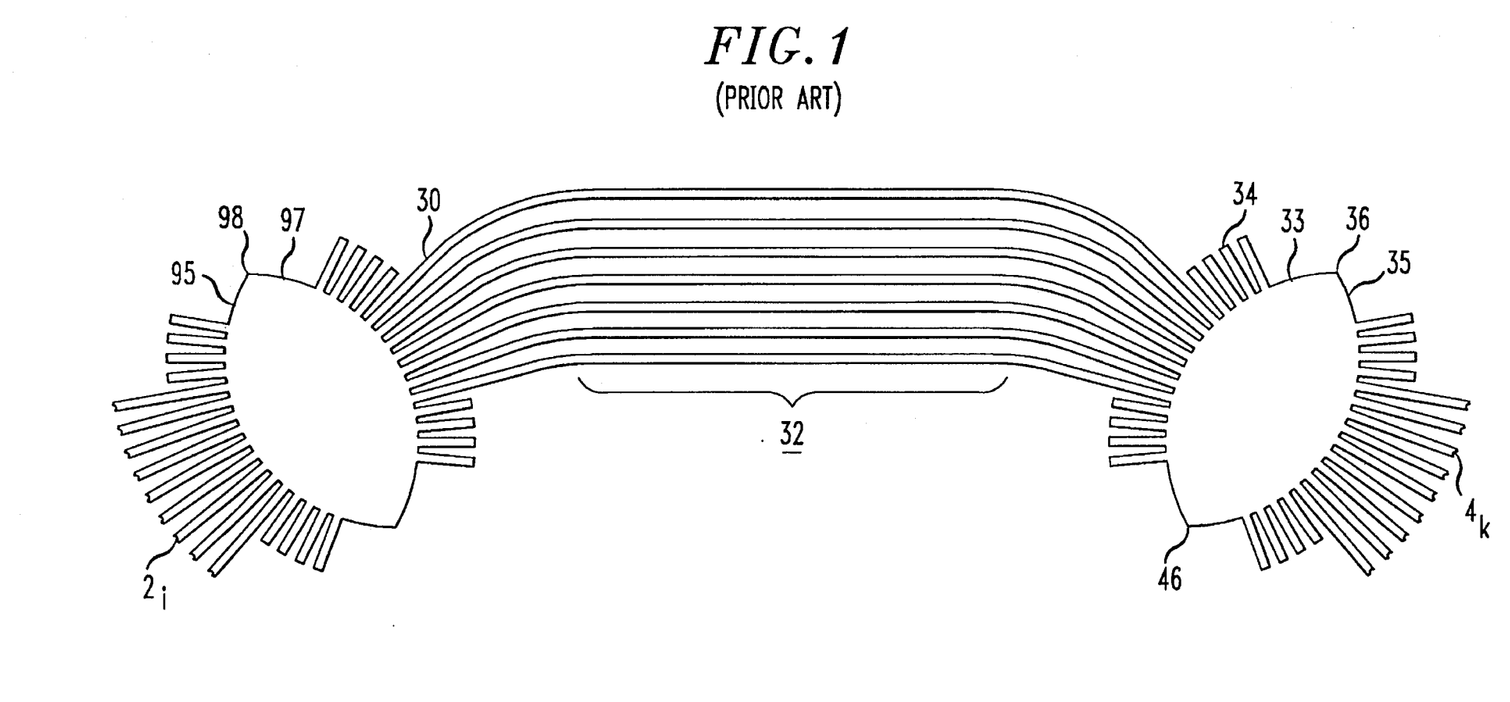
FIG. 1 illustrates an example of a conventional optical frequency routing device.

FIG. 1 shows the pertinent details of a conventional frequency routing device. The frequency routing device contains a plurality of input ports $2_i$, i=1, 2, ..., N connected to the input circle 95 of a free space region 98. A plurality of output ports 30 extends from the output circle 97 of the free space region 98 and is connected to an optical grating 32. The optical grating 32 comprises a plurality of unequal length waveguides which provides a predetermined amount of path length difference to a corresponding plurality of input waveguides 34 connected to the input circle 33 of another free space region 46. The output circle 35 of the free space region 46 is connected to a plurality of output ports $4_k$, k=1, 2, ..., N. The various input and output ports are formed from waveguides. These frequency routing devices operate as multiplexers and demultiplexers of optical frequencies. For example, if a signal of amplitude A is applied to input port $2_1$ then signals of amplitudes $AT_{11}, AT_{12}, \ldots AT_{1N}$ are produced at the output ports, where $T_{ik}$ is the value of the transmission coefficient for input port $2_i$ and output port $4_k$. Additional details concerning these routing devices are found in the above-referenced patents.

Figure 2:
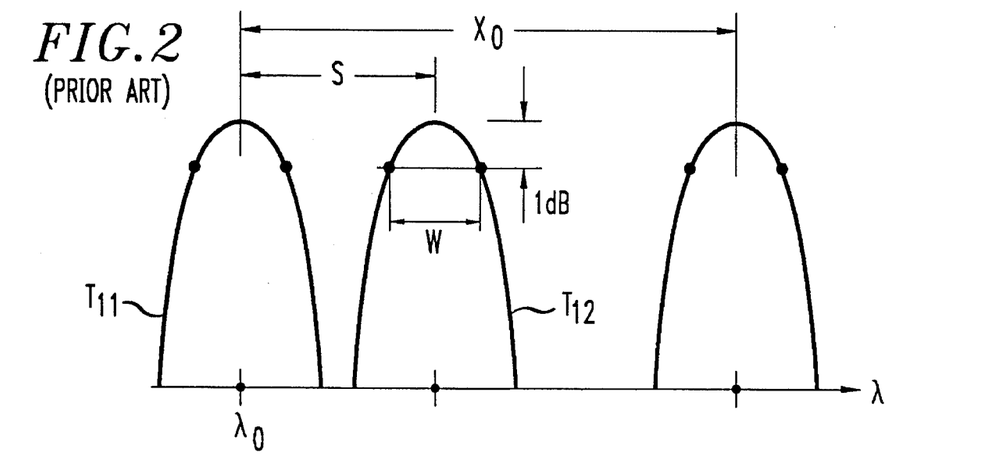
FIG. 2 is a graph showing the transmission coefficients $T_{ik}$ for the routing device of FIG. 1.

The typical behavior of the routing device shown in FIG. 1 is illustrated in FIG. 2. This figure shows the set of transmission coefficients $T_{1k}$ for the routing device for the particular input port $2_1$ as a function of wavelength λ. The channel spacing S indicated in FIG. 2 is defined as the wavelength separation between maximum peaks of adjacent transmission coefficients. The variation of each transmission coefficient as a function of wavelength is essentially periodic with a period $X_0$, which is often referred to as the free spectral range of the device. The wavelengths $\lambda_0, \lambda_1, \ldots, \lambda_k$ of maximum transmission for each of the transmission coefficients are referred to as the center wavelengths. The transmission coefficients are substantially equal to unity at the center wavelengths if certain inherent losses are taken into account. In particular, the transmission coefficient will be equal to unity if wavelength independent losses are added thereto. These losses do not alter the principles upon which the present invention is based and hence they will be neglected in the discussion below.

In a conventional routing device the channel spacing S is chosen to be large enough to ensure negligible crosstalk between different waveguides. Thus, in the vicinity of a particular wavelength of maximum transmission such as $\lambda_0$ in FIG. 2, for a particular coefficient $T_{ik}$, all other coefficients $T_{ik}$ are negligible. In other words, the various coefficients $T_{ik}$ are typically designed to be essentially non-overlapping, as in FIG. 2. The above-described conventional routing device has an undesirable feature, namely, that the passband is not very flat over its entire width W, as FIG. 2 indicates.

Figure 3:
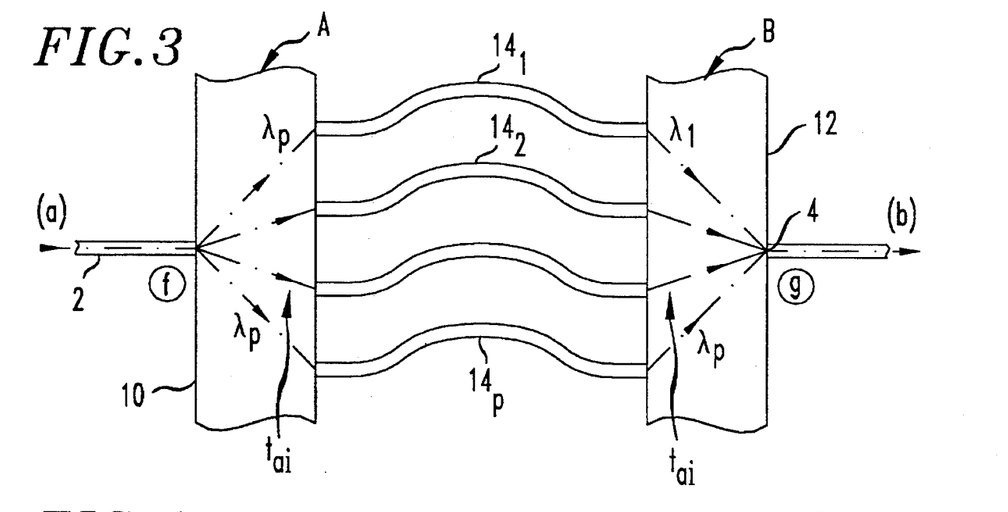
FIG. 3 illustrates one embodiment of a routing arrangement constructed in accordance with the present invention.

FIG. 3 shows one embodiment of a routing arrangement constructed in accordance with the present invention. The routing arrangement is composed of two frequency routing devices 10 and 12 such as shown in FIG. 1. For the purposes of illustration only, each routing device is configured as a 1×N routing device. However, in general, the two routing devices may have differing numbers of input and output ports. P of the N output ports of the first routing device are optically coupled in series to P of the N input ports of the second routing device via a series of transmission waveguides $14_1, 14_2, \ldots, 14_p$. The value of P may be equal to or less than the value of N. In FIG. 3, no distinction is made between the ends of the input and output ports and the respective transmission lines connected thereto since in practice these waveguides may be fabricated as integral, continuous waveguides. However, optical coupling between the various ports and the transmission lines may be achieved in any desired manner. Each of the individual routing devices 10 and 12 are configured to transit P distinct center wavelengths $\lambda_1, \lambda_2, \ldots, \lambda_p$, which are typically, but not necessarily, equally spaced apart from one another. Moreover, the routing devices 10 and 12 are configured so that adjacent ones of each of the passbands overlap, such as indicated in FIG. 2. This overlap allows transmission to occur at all wavelengths between $\lambda_1$ and $\lambda_{i+1}$.

In operation, the first routing device 10 demultiplexes a signal directed to its input port 2 in the manner described above. If a multiplexed signal composed of wavelengths $\lambda_1, \lambda_2, \ldots, \lambda_p$ is directed to input port 2 of the first routing device 10, each wavelength will be directed to a respective one of the transmission lines $14_1, 14_2, \ldots, 14_p$. The transmission lines then direct the wavelengths to the input ports of the second routing device 12, which multiplexes the wavelengths so that they appear on output port 4.

The routing arrangement shown in FIG. 3 contains p distinct optical paths between the input port 2 of the first routing device 2 and the output port 4 of the second routing device 12. Each path corresponds to one of the p transmission lines and each path is characterized by a distinct transmission coefficient t. The transmission coefficients $t_1, t_2, \ldots, t_p$ each have an amplitude of approximately unity at the center wavelengths $\lambda_1, \lambda_2, \ldots, \lambda_p$. The total transmission coefficient T of the device is therefore equal to the sum of the individual coefficients:

$$T = \sum_1^p t_i$$

Figure 4:
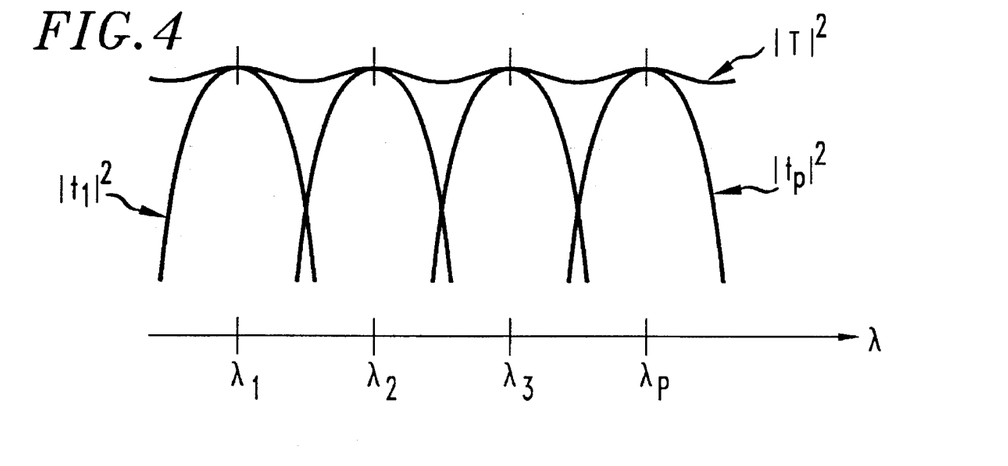
FIG. 4 is a graph showing the transmission coefficients for each of the distinct paths in the routing arrangement shown in FIG. 3.

The total transmission coefficient T will exhibit p maxima, which each occur at one of the center wavelengths $\lambda_1, \lambda_2, \ldots, \lambda_p$. FIG. 4 shows the transmission coefficients $t_1, t_2, \ldots, t_p$ as a function of wavelength. As FIG. 4 indicates, between each pair of adjacent maxima there is a wavelength for which the total transmission coefficient has a minimum amplitude. These minima are produced at approximately the intermediate wavelengths $$\frac{\lambda_i + \lambda_{i+1}}{2}$$

In order to produce an idealized flat passband (i.e., a passband that is completely flat), the total transmission coefficient T should have an amplitude of approximately unity at the center wavelengths $\lambda_1, \lambda_2, \ldots, \lambda_p$ as well as the intermediate wavelengths halfway between them. In other words, the transmission coefficients for each of the center wavelengths $\lambda_i$ should fulfill the following condition:

$$|t_i| = 1 \text{ for } \lambda = \lambda_i \tag{1}$$

At the intermediate wavelengths halfway between the center wavelengths, only two of the individual coefficients appreciably contribute to the total transmission coefficient T. In particular at the intermediate wavelength $$\frac{\lambda_i + \lambda_{i+1}}{2}$$

only the coefficients $t_i$ and $t_{i+1}$ significantly contribute to the total transmission coefficient T. Thus, to obtain a flat passband in the vicinity of the ith intermediate wavelength, $t_i$ and $t_{i+1}$ must fulfill the following condition:

$$2|t_i| = 2|t_{i+1}| \cong 1 \text{ for } \lambda = \frac{\lambda_i + \lambda_{i+1}}{2} \tag{2}$$

A flat passband (i.e., $|T|^2 \cong 1$) in principal will result over the entire passband interval $\lambda_i < \lambda < \lambda_{i+1}$ by fulfilling conditions (1) and (2) set forth above, provided, of course, that the transmission coefficients $t_i$ and $t_{i+1}$ are in phase. The transmission coefficients for the transmission lines $14_1, 14_2, \ldots, 14_p$ will all be in phase if they are all provided with the same group delay. As one of ordinary skill in the art will recognize, the transmission lines $14_1, 14_2, \ldots, 14_p$ will all have transmission coefficients with the same group delay if their lengths are properly chosen so that an optical pulse directed from the input circle of the first routing device 10 to the output circle of the second routing device will require the same transit time for each of the paths p.

Of course, an idealized flat passband with $|T|^2$ exactly equal to unity over the entire passband is not possible to achieve. In fact, it can be shown that for a routing arrangement composed of a 1×2 router combined with an N×N router, where N is large, the best that can be achieved is approximately $|T|^2 \cong 0.81$, which corresponds to a passband ripple of about 0.912 dB. This ripple may be substantially eliminated by increasing the passband width of the second router 12, but with a small decrease in efficiency. The passband width may be increased, for example, by increasing the width of the output ports of the second router 12 at the point where they are connected to the output circle of the free space region.

As noted above, each of the individual routing devices 10 and 12 are periodic with a period $X_0$. Accordingly, when the routing devices are combined in accordance with the present invention, the resulting arrangement also will be periodic. For example, assume for illustrative purposes only that the period $x_0$ of each routing device is an integer multiple of the channel spacing (which is typically the case, as FIG. 2 indicates), say NS for the first routing device and MS for the second routing device. The period of the resulting arrangement is then also an integer multiple of the channel spacing and this integer is the smallest integer that is the least common multiple of N and M. In those cases where a large period is desired, N and M may be advantageously chosen so that one is not a multiple of the other. For example, if N=7 and M=9, the period of the resulting device is 63S, whereas if N=3 and M=9, the period of the resulting device is 9S.

Figure 5:
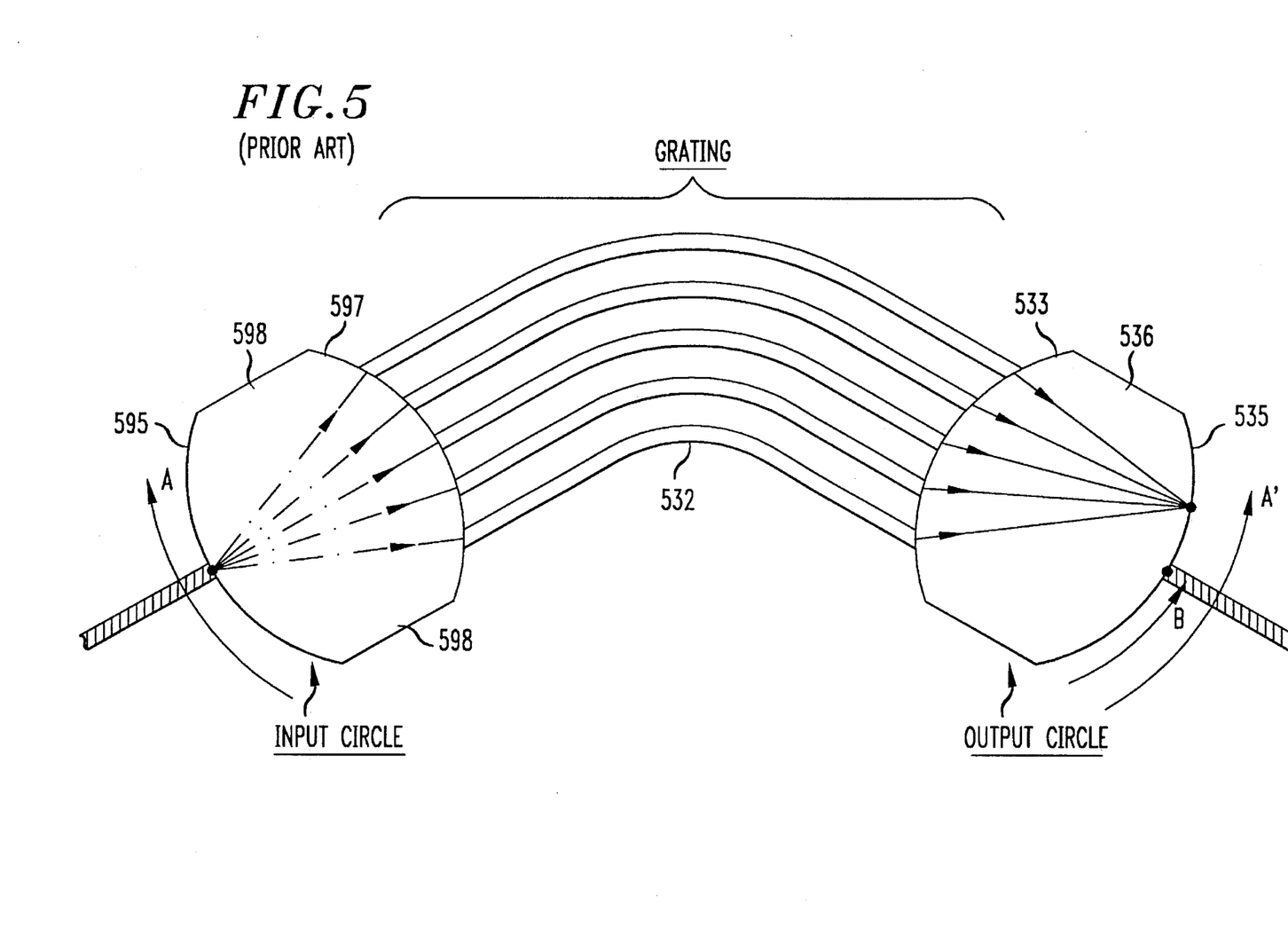
FIG. 5 shows a conventional routing device such as shown in FIG. 1 illustrating the transmission of an image from an input port to an output port.

Before proceeding to discuss an alternative embodiment of the invention, it is necessary to further describe the manner in which the known routing device shown in FIG. 1 operates. In such a device, the optical grating 32 serves as an imaging apparatus. At any particular wavelength, the grating 32 transmits a filtered image of some initial optical distribution from the input port $2_i$ of the routing device to the output circle 35 of the output free space region 36. For example, FIG. 5 shows a known routing device in which an input image emanates from point A on the input circle 595 of the input free space region 598 and is transmitted to point A' on the output circle 535 of the output free space region 536. Point B on the output circle 535 of the output free space region 536 denotes the location of the output port through which the image is to be transmitted.

As noted above, the optical grating 532 comprises a plurality of waveguides in which adjacent waveguides have a constant path length difference between them. As a result of this arrangement, the image location A' varies as a function of wavelength. It is this variation that is responsible for the relationship between the transmission coefficients and wavelength shown in FIG. 2. In FIG. 5, a transmission coefficient of nearly unity will only result if A' substantially coincides with B. Thus, to obtain a substantially flat passband with nearly unity transmission the image location A' must remain coincident with B for all wavelengths in the passband interval approximately defined between $\lambda_i < \lambda < \lambda_{i+1}$. Accordingly, the location A from which the input image emanates should vary with wavelength to maintain point A' substantially coincident with B. The following discussion will demonstrate how this requirement can be more optimally and flexibly achieved by the routing arrangement of the present invention.

Figure 6:
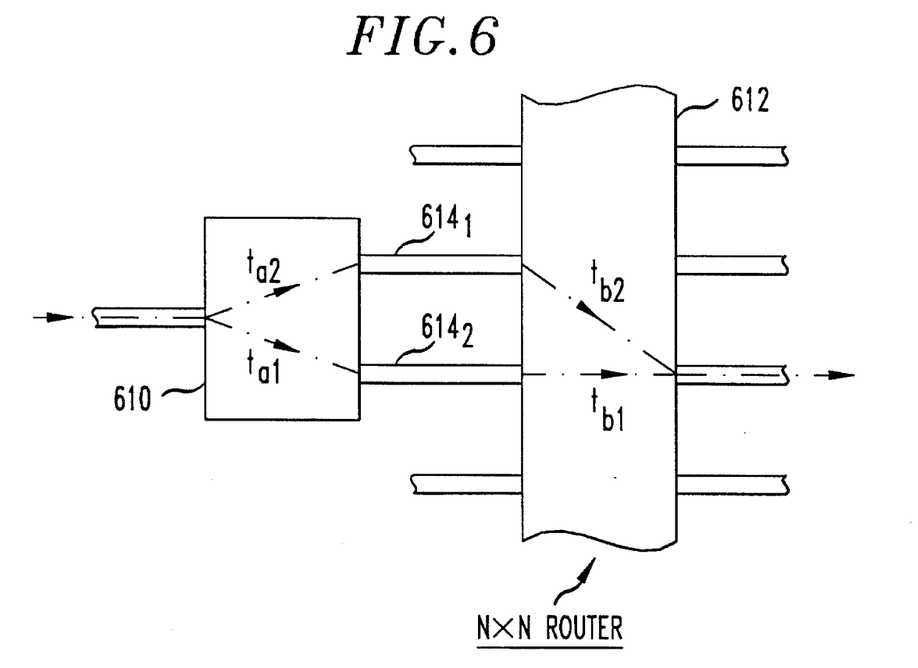
FIG. 6 shows an alternative embodiment of the present invention in which the first frequency routing device is configured as a 1×2 routing device.
Figure 7:
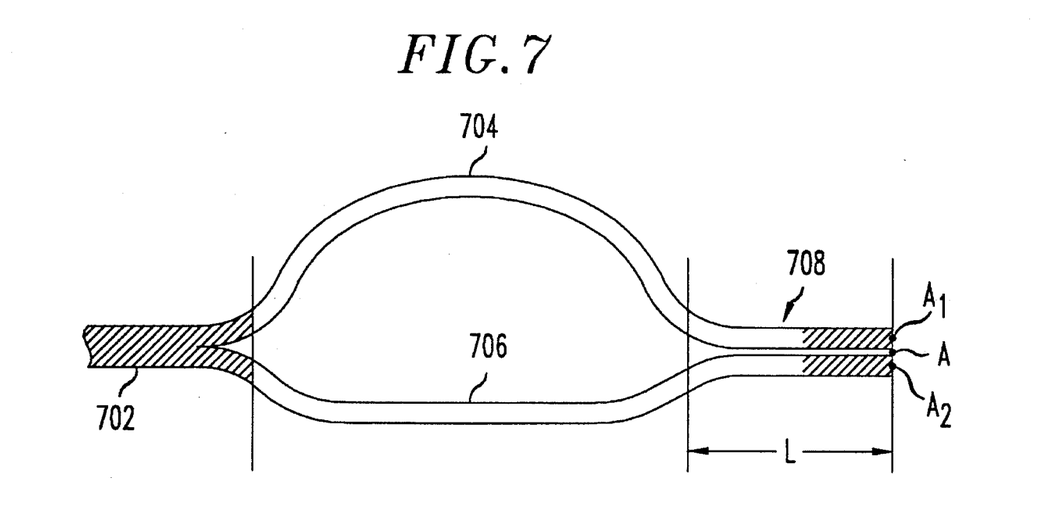
FIG. 7 shows a Mach-Zehnder apparatus that may serve as the 1×2 routing device shown in FIG. 6.

FIG. 6 shows one embodiment of the present invention in which a 1×2 frequency routing device 610 is coupled to a N×N routing device 612, where N>2. As is well known to those of ordinary skill in the art, a 1×2 frequency routing device is essentially equivalent to a Mach-Zehnder apparatus such as shown in FIG. 7. In FIG. 7, the Mach-Zehnder apparatus is composed of a Y-branch coupler 702 that is optically coupled to two waveguides 704 and 706 of unequal length. The waveguides 704 and 706 terminate in an output section 708 in which the waveguides 704 and 706 have a predetermined length and a predetermined spacing between them. When the Mach-Zehnder apparatus of FIG. 7 is incorporated into the arrangement of FIG. 6, the Y-branch coupler 702 serves as the input port of the input frequency routing device 610 and the ends of the waveguides 704 and 706 in the output section 708 serve as the two output ports of the input frequency routing device 610 that are respectively coupled to the transmission lines $614_1$ and $614_2$.

In operation, the Y-branch coupler 702 transfers half of the power of the input signal to each of the waveguides 704 and 706. Because the waveguides 704 and 706 have different path lengths, they produce in the output section 708 a wavelength-dependent phase difference between the two halves of the signal propagating in each waveguide. The spacing between the waveguides 704 and 706 in the output section 708 and the lengths thereof are chosen so that the two waveguides 704 and 706 are strongly coupled. In particular, the length of the waveguides 704 and 706 in the output section 708 is chosen so that half of the power propagating in each of the waveguides 704 and 706 prior to reaching the output section 708 is subsequently transferred to the other waveguide.

If an input signal of wavelength $\lambda_0$ is directed into the Y-branch coupler 702 of the above-described Mach-Zehnder apparatus and if the phase difference produced in the two waveguides 704 and 706 is an integer multiple of $2\pi$, the output signal at the end of the output section 708 will be centered at the midpoint $A_0$ between the axial points $A_1$ and $A_2$ of the waveguides 704 and 706 since half the power is propagating in each arm. If the wavelength of the input signal is increased to $\lambda_2$ so that the phase difference is decreased by $\pi/2$, the output signal is centered along axis $A_2$. Similarly, if the wavelength of the input signal is decreased to $\lambda_1$ so that the phase difference is increased by $\pi/2$, the output signal will be located along axis $A_1$. Thus, in summary, as the wavelength of the input signal increases from $\lambda_1$ to $\lambda_0$ to $A_2$, the location about which the output signal is centered along a line perpendicular to the axes of the waveguides 704 and 706 continuously varies from $A_1$ to $A_0$ to $A_2$, respectively.

Figure 8:
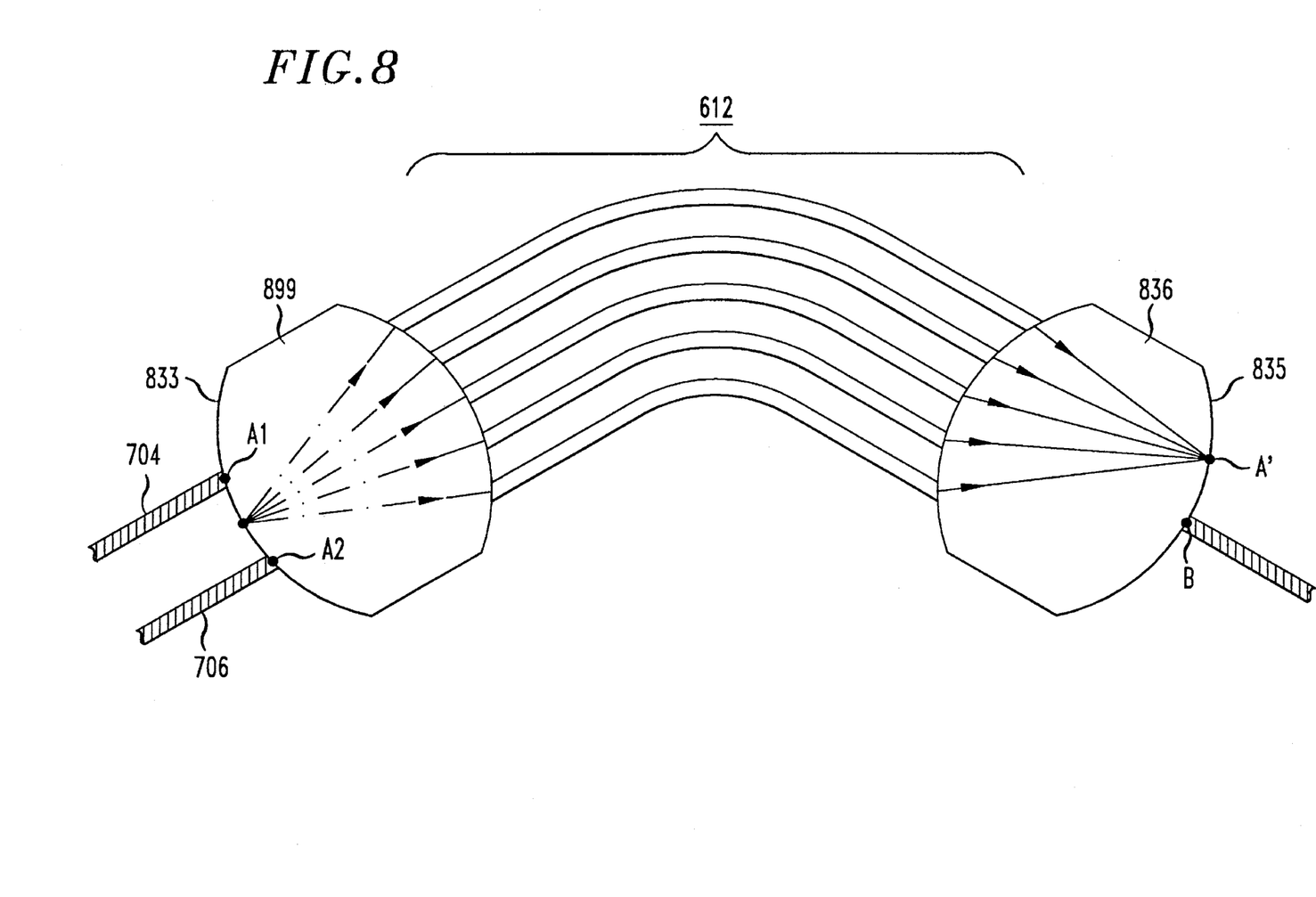
FIG. 8 shows an expanded view of a portion of the embodiment of the invention shown in FIG. 6 which incorporates the Mach-Zehnder apparatus shown in FIG. 7.

FIG. 8 shows an expanded view of a portion of the embodiment of the invention shown in FIG. 6 in which the waveguides 704 and 706 of the Mach-Zehnder apparatus form the input ports of the second frequency routing device 612. As FIG. 8 indicates, the points $A_0$, $A_1$ and $A_2$ discussed in connection with FIG. 7 are now located on the input circle 833 of the free space region 897 of the second frequency routing device 612. Thus, an input signal directed through the Mach-Zehnder apparatus provides an image on the input circle 833 of the second frequency routing device 612 at a location between $A_1$ and $A_2$ that is a periodic function of wavelength.

With reference to FIG. 8, the criterion for providing a flat passband with nearly unity transmission is that an input signal having a wavelength in the passband interval between $\lambda_1$ and $\lambda_2$ should be directed to point B on the output circle 835 of the output free space region 836 of the second frequency routing device 612, where point B denotes the location of the output port of interest. This criterion is simply the general criterion discussed above particularized to the situation shown in FIG. 8. To fulfill this criterion the Mach-Zehnder apparatus should be arranged so that an input signal of wavelength $\lambda_1$ is directed with nearly unity transmission from point $A_1$ to point B and an input signal of wavelength $80_2$ is directed with nearly unity transmission from point $A_2$ to point B. By maximizing the transmission coefficient T in this manner for the two wavelengths $\lambda_1$ and $\lambda_2$, an equal-ripple passband will be obtained over the passband interval between $\lambda_1$ and $\lambda_2$.

In principle, unity transmission over the entire passband interval between $\lambda_1$ and $\lambda_2$ requires a complete and perfect match between the location of the signal on the output circle 835 and the location of the output port. This requirement can only be met if the spatial distribution of the input signal remains constant over the passband. In practice, however, the distribution produced at $A_0$ for $\lambda=\lambda_0$ will in general have a larger width than the distribution produced at $A_1$ and $A_2$. As a result, the transmission coefficient produced at $\lambda_0$ will be in general smaller than the transmission coefficient produced at $\lambda_1$ and $\lambda_2$. This difference in the transmission coefficients will be small if the spacing between the waveguides 704 and 706 in the output section 708 is small. However, the difference can be eliminated by slightly increasing the width of the output port, for example, so that the transmission coefficient for $\lambda_0$ is increased while the transmission coefficient for $\lambda_1$ and $\lambda_2$ is decreased. In this manner a passband that is as flat as is practically possible can be obtained.

In an alternative embodiment of the invention, the routing arrangement shown in FIG. 8 may be configured to be tunable. If the two waveguides 704 and 706 of the Mach-Zehnder apparatus shown in FIG. 8 have substantially the same length, there will be no phase difference between the signals propagating therein. Since the phase difference between the signals is zero, the location of the signal on the input circle 833 of the free space region 897 of the second frequency routing device will remain stationary. If one of the waveguides 704 and 706 is provided with a phase shifter that can selectively shift the optical path length of the waveguide by a predetermined amount, a predetermined amount of relative phase shift can be imparted to the signals propagating therein. By imparting such a phase shift, the location of the resulting signal on the input circle 833 of the second routing device 612 also can be predetermined. Moreover, by preselecting the location of the signal in this manner, the center wavelength of maximum transmission for any given transmission coefficient also can be preselected, thus providing tunability. As one of ordinary skill in the art will recognize, the phase shifter provided in one of the arms of the Mach-Zehnder apparatus may be chosen from among a variety of different phase shifters. For example, the phase shifter may be a heating element that changes the temperature of the waveguide which in turn causes a change in its optical path length.

In another alternative embodiment of the present invention, the polarization shift (i.e., the splitting of each wavelength of maximum transmission into two distinct peaks corresponding to the two principal polarizations TE and TM) caused by strain birefringence can be reduced or even eliminated. This reduction is accomplished in a manner analogous to that employed in the tunable routing arrangement discussed above. In this case however, rather than a phase shifter, a polarization shifter is incorporated into one of the waveguides of the Mach-Zehnder apparatus. The polarization shifter, which may be of any type known to those of ordinary skill in the art, introduces a suitable birefringence into the waveguide. One technique for introducing such birefringence is disclosed, for example, in M. Kawachi, "Silica Waveguides on Silicon and their Application to Integrated-Optical Components," Optical and Quantum Electronics, 22 (1990) pp. 391–416.

Figure 9:
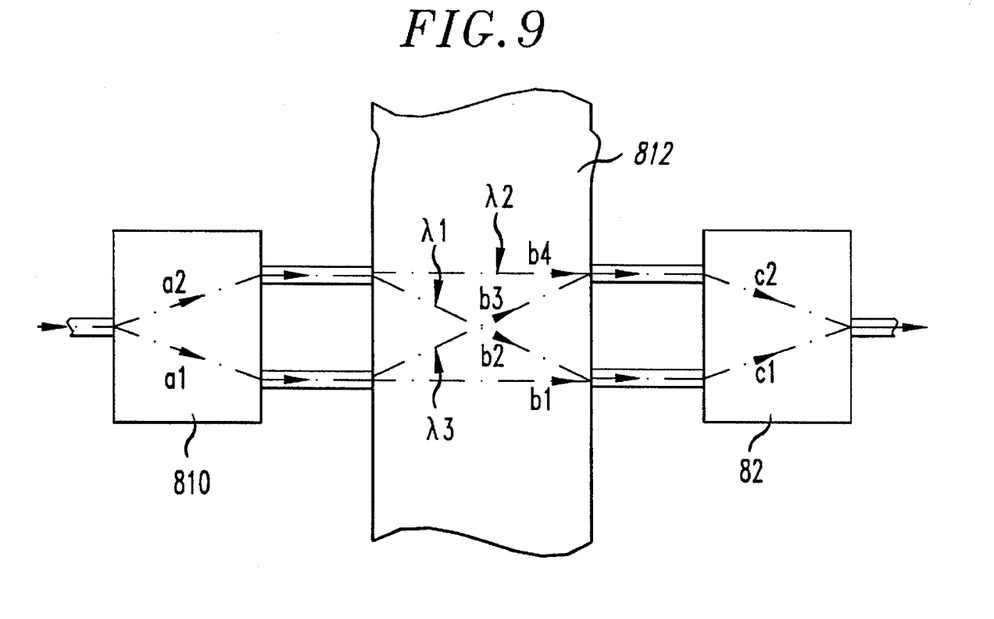
FIG. 9 shows an alternative embodiment of the present invention which employs two Mach-Zehnder devices.

FIG. 9 shows another embodiment of the invention based on the embodiment shown in FIG. 6 in which a Mach-Zehnder apparatus is coupled to the inputs of an N×N routing device. In the arrangement of FIG. 9 the input ports of a second Mach-Zehnder apparatus 820 are coupled to two output ports of the frequency routing device 812. As in the embodiment shown in FIG. 6, the first Mach-Zehnder apparatus 810 serves to provide an image on the input circle of the frequency routing device 812 at a location that is a periodic function of wavelength. The second Mach-Zehnder apparatus 820 receives the image from the output ports of the frequency routing device 812 in a manner completely analogous to the optical coupling between the first Mach-Zehnder apparatus 810 and the frequency routing device 812 discussed above in connection with FIG. 6. Accordingly, the location of the image on the input circle of the frequency routing device 812 and the location at which the second Mach-Zehnder apparatus 820 is capable of optimally receiving the image from the frequency routing device 812 are both predeterminable and controllable.

Figure 10:
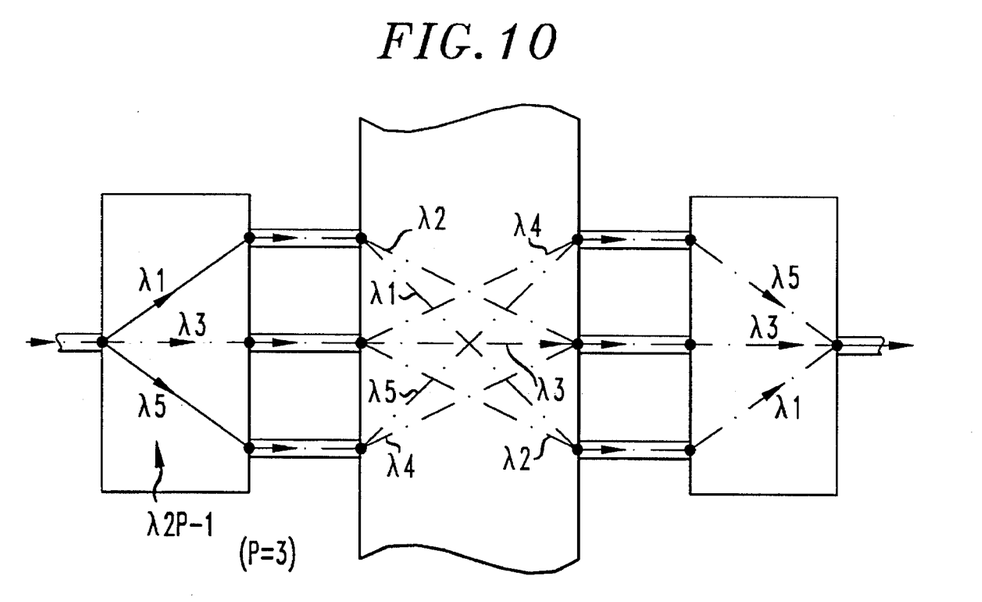
FIG. 10 shows an embodiment of the present invention which is generalized from the embodiment shown in FIG. 9.

By properly synchronizing the two Mach-Zehnder devices 810 and 820, the resulting arrangement shown in FIG. 9 provides a wide passband that includes three wavelengths of maximum transmission. The optical paths shown in FIG. 9 indicate how these maxima arise. The optical paths are labeled in accordance with the respective ones of the wavelengths $\lambda_1, \lambda_2, \ldots, \lambda_3$ traversed by that path. As the figure indicates, wavelength $\lambda_2$ traverses two distinct paths in the frequency routing device 812 before being recombined in the second Mach-Zehnder apparatus 820. The embodiment shown in FIG. 9 may be generalized as shown in FIG. 10 by replacing the two Mach-Zehnder devices with frequency routing devices having more than two input and output ports. FIG. 10 shows that five wavelengths of maximum transmission arise when the three frequency routing devices have three ports that are coupled together. More generally, if the three routing devices such as shown in FIG. 10 have P ports coupled together, a total of 2P–1 wavelengths of maximum transmission can be provided within the passband.

I claim:

1. An optical apparatus comprising:
    a first frequency routing device having at least one input port and P output ports, where P>2;
    a second frequency routing device having at least P input ports and at least one output port;
    P optical paths coupling the output port of the first frequency routing device to the input port of the second frequency routing device; and
    wherein the optical paths each have a transmission coefficient substantially equal to unity at a distinct optical wavelength, each of said transmission coefficients being substantially equal to one half unity at an intermediate wavelength approximately halfway between adjacent ones of said distinct optical wavelengths.

2. The apparatus of claim 1 wherein said transmission coefficient is substantially equal to unity at said distinct wavelength after adding thereto substantially wavelength independent losses and is substantially equal to one half unity at said intermediate wavelength after adding thereto substantially wavelength independent losses.

3. The apparatus of claim 2 wherein the transmission coefficients of the optical paths all have substantially the same group delay.

4. The apparatus of claim 3 wherein the first frequency routing device further comprises a plurality of input ports and the second frequency routing device comprises a plurality of output ports.

5. The optical apparatus of claim 2 wherein the first and second frequency routing devices each comprise:
    a first plurality of waveguides;
    a first free space region connected to the first plurality of waveguides;
    a second plurality of waveguides connected to the first free space region;
    an optical grating connected to the second plurality of waveguides comprising a plurality of unequal length waveguides;
    a third plurality of waveguides connected to the optical grating;
    a second free space region connected to the third plurality of waveguides; and a fourth plurality of waveguides connected to the second free space region.

6. An optical apparatus comprising:

a first frequency routing device having at least one input port and P output ports, where P>2;

a second frequency routing device having at least P input ports and at least one output port;

P optical paths coupling the output of the first frequency routing device to the input port of the second frequency routing device; and wherein the optical paths each have a transmission coefficient equal to a maximum value at a distinct optical wavelength, and each pair of adjacent optical paths produces a transmission coefficient having a minimum value at an intermediate wavelength approximately halfway between adjacent ones of said distinct optical wavelengths.

7. The apparatus of claim 6 wherein the transmission coefficients of the optical paths all have substantially the same group delay.

8. An optical apparatus comprising:

a first frequency routing device having at least one input port and a plurality of output ports;

a second frequency routing device having a plurality of input ports and at least one output port;

a plurality of waveguides each coupling one of the output ports of the first frequency routing device to one of the input ports of the second frequency routing device;

wherein the output ports of the first frequency routing device are coupled to the input ports of the second frequency routing device in a consecutive order;

wherein the first frequency routing device is a Mach-Zehnder apparatus;

wherein said Mach-Zehnder apparatus comprises a Y-branch coupler serving as said input port and first and second output waveguides coupled to said Y-branch coupler, said first and second output waveguides terminating in an output section such that a predetermined portion of an optical signal propagating in each of the first output waveguides is transferred to the other one of the first and second output waveguides; and wherein said predetermined portions of the optical signals transferred between the first and second output waveguides of the Mach-Zehnder apparatus are substantially equal to half the power of each optical signal.

9. The apparatus of claim 8 further comprising a phase shifter disposed in said first output waveguide of the Mach-Zehnder apparatus for selectively shifting by a predetermined amount the optical path length of the first output waveguide relative to the second output wavelength.

10. The apparatus of claim 9 wherein said phase shifter is a heating element.

11. The apparatus of claim 9 wherein said first and second output waveguides are substantially equal in length.

12. The apparatus of claim 8 wherein said first and second output waveguides of the Mach-Zehnder apparatus have different optical path lengths such that two signals having distinct wavelengths separated by a predetermined value are both transmitted to a preselected output port of the second frequency routing device with substantially unity transmission.

13. The apparatus of claim 12 wherein said predetermined value separating the wavelengths of the two signals is substantially equal to a passband interval.

14. The apparatus of claim 8 wherein said first and second output waveguides of the Mach-Zehnder apparatus have different optical path lengths such that two signals having distinct wavelengths separated by a predetermined value are both transmitted to a preselected output port of the second frequency routing device with substantially unity transmission.

15. The apparatus of claim 8 further comprising a second Mach-Zehnder apparatus having two input ports coupled to two output ports of the second frequency routing device.

\* \* \* \* \*

UNITED STATES PATENT AND TRADEMARK OFFICE
CERTIFICATE OF CORRECTION

PATENT NO. : 5,488,680  
APPLICATION NO. : 08/295445  
DATED : January 30, 1996  
INVENTOR(S) : Corrado Dragone

Page 1 of 1

It is certified that error appears in the above-identified patent and that said Letters Patent is hereby corrected as shown below:

Column 8, line 31, "output" should read --input--;  
Column 8, line 32, "input" should read --output--.

Signed and Sealed this

Twenty-fifth Day of March, 2008

JON W. DUDAS  
*Director of the United States Patent and Trademark Office*